United States Patent
Kim et al.

(10) Patent No.: US 12,175,393 B2
(45) Date of Patent: Dec. 24, 2024

(54) METHOD AND DEVICE FOR RECOMMENDING PICK UP LOCATION

(71) Applicants: Hyundai Motor Company, Seoul (KR); Kia Corporation, Seoul (KR)

(72) Inventors: Tae Un Kim, Seongnam-si (KR); Hong Gyun Lee, Goyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/062,793

(22) Filed: Dec. 7, 2022

(65) Prior Publication Data

US 2023/0342673 A1    Oct. 26, 2023

(30) Foreign Application Priority Data

Apr. 26, 2022    (KR) .................. 10-2022-0051360

(51) Int. Cl.
| | |
|---|---|
| *G06Q 10/02* | (2012.01) |
| *G01C 21/34* | (2006.01) |
| *G06Q 30/0283* | (2023.01) |
| *G06Q 50/40* | (2024.01) |

(52) U.S. Cl.
CPC ......... *G06Q 10/02* (2013.01); *G01C 21/3407* (2013.01); *G06Q 30/0284* (2013.01); *G06Q 50/40* (2024.01)

(58) Field of Classification Search
CPC .... G06Q 10/02; G06Q 30/0284; G06Q 50/30; G01C 21/3407
USPC .......................................................... 705/5
See application file for complete search history.

(56) References Cited

U.S. PATENT DOCUMENTS

| | | | |
|---|---|---|---|
| 2020/0175446 A1 | 6/2020 | Kurosawa et al. | |
| 2021/0304616 A1 | 9/2021 | Okoso et al. | |
| 2021/0326783 A1* | 10/2021 | Kim ................... | G01C 21/3697 |
| 2022/0084155 A1* | 3/2022 | Frederick ............... | G06Q 50/40 |
| 2023/0228579 A1* | 7/2023 | Gu ..................... | G06Q 30/0284 |
| | | | 701/482 |

FOREIGN PATENT DOCUMENTS

| | | |
|---|---|---|
| CN | 108023919 A | 5/2018 |
| JP | 2008111842 A | 5/2008 |
| KR | 102078177 B1 | 4/2020 |
| KR | 102086154 B1 | 4/2020 |
| KR | 102192724 B1 | 12/2020 |
| KR | 20210005353 A | 1/2021 |
| KR | 102242422 B1 | 4/2021 |
| KR | 102263469 B1 | 6/2021 |

OTHER PUBLICATIONS

"Analysis of the passenger pick-up pattern for taxi location recommendation" Published by IEEE (Year: 2008).*

* cited by examiner

*Primary Examiner* — Zeina Elchanti
(74) *Attorney, Agent, or Firm* — SLATER MATSIL, LLP

(57) ABSTRACT

An embodiment method, performed by a device, for recommending a location in which a vehicle picks up a user includes acquiring user data including a location of the user, acquiring traffic data corresponding to the user data, calculating a plurality of candidate pickup locations corresponding to a plurality of types based on the user data and the traffic data, and providing the candidate pickup locations and operation information of each of the candidate pickup locations to the user.

16 Claims, 8 Drawing Sheets

METHOD AND DEVICE FOR RECOMMENDING PICK UP LOCATION

CROSS-REFERENCE TO RELATED APPLICATIONS

This application claims the benefit of Korean Patent Application No. 10-2022-0051360, filed on Apr. 26, 2022, which application is hereby incorporated herein by reference.

TECHNICAL FIELD

The present disclosure relates to a method and device for recommending a pickup location.

BACKGROUND

The contents described in this section merely provide background information related to embodiments of the present disclosure and do not constitute the prior art.

A vehicle hailing service that connects a consumer who wants to move and a vehicle that provides a mobility service in real time is increasing rapidly.

In the vehicle hailing service, a map within a certain radius from a current location of a user is displayed on a terminal, and the user designates a pickup location with reference to the map.

However, since such a vehicle hailing service does not provide a function such as suggesting a pickup location to the user, there is a problem that the user has to designate an appropriate pickup location while identifying the traffic conditions or transferable transportation in a nearby area.

SUMMARY

In view of the above, embodiments of the present disclosure provide a method and device for recommending a pickup location, which recommends various candidate pickup locations to a user to enable to plan a movement route suitable for the user's preference.

The features achievable by embodiments of the present disclosure are not limited to the above-mentioned features, and other features not mentioned will be clearly understood by those skilled in the art from the following description.

At least one embodiment of the present disclosure provides a method for recommending a location in which a vehicle picks up a user. The method includes acquiring user data including a location of the user, acquiring traffic data corresponding to the user data, calculating a plurality of candidate pickup locations corresponding to a plurality of types, based on the user data and the traffic data, and providing the candidate pickup locations and operation information of each of the candidate pickup locations to the user.

Another embodiment of the present disclosure provides a device for recommending a location in which a vehicle picks up a user. The device includes an acquisition unit configured to acquire user data including a location of the user and traffic data corresponding to the user data, a calculation unit configured to calculate a plurality of candidate pickup location corresponding to a plurality of types, based on the user data and the traffic data, and an output unit configured to provide the candidate pickup locations and operation information of each of the candidate pickup locations to the user.

According to one embodiment of the present disclosure, various candidate pickup locations are recommended to a user, which enables planning of a movement route suitable for the user's preference.

According to one embodiment of the present disclosure, information for comparison between candidate pickup locations is provided, which enables a passenger to plan a route according to his/her preference in planning a route to a destination.

According to one embodiment of the present disclosure, candidate pickup locations capable of allowing a passenger to transfer from another transportation are provided, which results in a large reduction in terms of a required fare or time from the passenger's current location to a destination.

Effects of embodiments of the present disclosure are not limited to the above-mentioned effects, and other effects not mentioned will be clearly understood by those skilled in the art from the following description.

DETAILED DESCRIPTION OF ILLUSTRATIVE EMBODIMENTS

Figure 1:
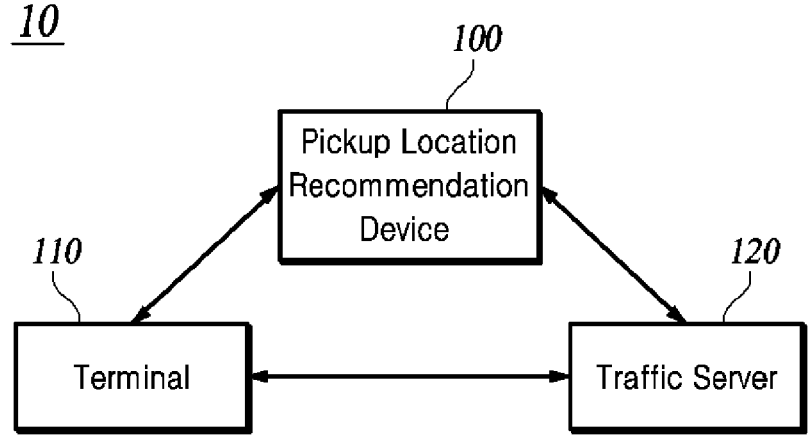
FIG. 1 is a block diagram schematically illustrating a system for providing a vehicle hailing service according to one embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

In describing the components of the embodiments, alphanumeric codes may be used such as first, second, i), ii), a), b), etc., solely for the purpose of differentiating one component from others but not to imply or suggest the substances, the order, or the sequence of the components. Throughout this specification, when parts "include" or "comprise" a component, they are meant to further include other components, not to exclude thereof unless there is a particular description contrary thereto.

The description of embodiments of the present disclosure to follow in conjunction with the accompanying drawings is intended to describe exemplary embodiments of the present disclosure and is not intended to represent the only embodiments in which the technical idea of the present disclosure may be practiced.

In embodiments of the present disclosure, a vehicle is any transportation that provides a hailing service to move a user to a destination, and may be a concept including a taxi, a shared vehicle, and the like. Furthermore, the vehicle may be a concept including an autonomous vehicle, a robotaxi, and the like, but is not limited to the above-described examples.

FIG. 1 is a block diagram schematically illustrating a system for providing a vehicle hailing service according to one embodiment of the present disclosure.

As shown in FIG. 1, the vehicle hailing service providing system 10 according to one embodiment of the present disclosure may include all or part of a terminal 110, a pickup location recommendation device 100, and a traffic server 120. Not all blocks shown in FIG. 1 are essential components, and in another embodiment, some blocks included in the vehicle hailing service providing system 10 may be added, changed, or deleted.

The pickup location recommendation device 100 may be configured to provide one or more candidate pickup locations to a user based on information obtained from the terminal 110 and/or the traffic server 120. The pickup location recommendation device 100 according to one embodiment of the present disclosure may be configured to be connected to the terminal 110 and/or the traffic server 120 through a wireless network to perform mutual data communication. For example, the pickup location recommendation device wo may be a server operated by a company providing a vehicle hailing service. In some embodiments, the pickup location recommendation device 100 may be configured to store and manage information collected from the terminal 110 and/or the traffic server 120.

The terminal 110 may be defined as a terminal of a user who wants to call a vehicle. For example, the terminal 110 may be provided as one of various electronic devices such as a smartphone, a smart watch, a tablet, a computer, an ultra mobile PC (UMPC), a workstation, a net-book, a personal digital assistant (PDA), a portable computer, a portable multimedia player (PMP), and the like, but the present disclosure is not limited thereto.

The terminal 110 according to one embodiment of the present disclosure may be equipped with an application for a vehicle hailing service. The terminal 110 may be configured to receive one or more candidate pickup locations from the pickup location recommendation device 100 through the application for a vehicle hailing service.

The traffic server 120 may be configured to provide traffic data for an arbitrary geographic location or route to the pickup location recommendation device 100. In this case, the traffic data may include traffic flow information of at least one section included in the geographical route and/or operation information of one or more other mode of transportations in the vicinity of the geographical location. The other mode of transportations may be, for example, at least one of a bus, a subway, a shared bicycle, or a shared kickboard. The operation information of other mode of transportations may include, for example, the location, route, fare, stop location and/or scheduled arrival time at the corresponding stop of the other mode of transportations.

The traffic server 120 may be, for example, a server operated by an organization that provides a real-time traffic information service or a company that provides operation services of one or more other mode of transportations, but is not limited thereto.

Although FIG. 1 shows the pickup location recommendation device 100 and the terminal 110 as independent components, the present disclosure is not limited thereto. According to another embodiment of the present disclosure, the function of the pickup location recommendation device 100 may be implemented by the terminal 110.

Meanwhile, when the vehicle hailing service is provided by distributing any vehicle among a plurality of vehicles to a user who requested a vehicle call, the vehicle hailing service providing system 10 may further include a dispatch server (not shown), and the function of the pickup location recommendation device 100 may be implemented by the dispatch server. In addition, when the vehicle hailing service is provided in such a way that a user calls a specific vehicle, such as a vehicle owned by someone or a shared vehicle designated in advance, the function of the pickup location recommendation device 100 may be implemented by the corresponding vehicle.

Figure 2:
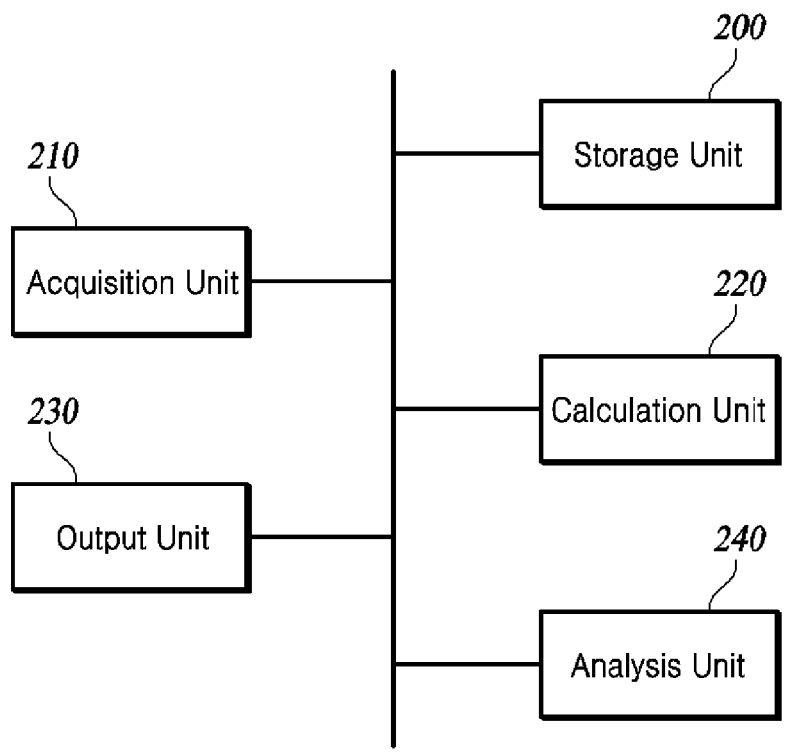
FIG. 2 is a block diagram schematically illustrating a device for recommending a pickup location according to one embodiment of the present disclosure.

FIG. 2 is a block diagram schematically illustrating the pickup location recommendation device according to one embodiment of the present disclosure.

Figure 3:
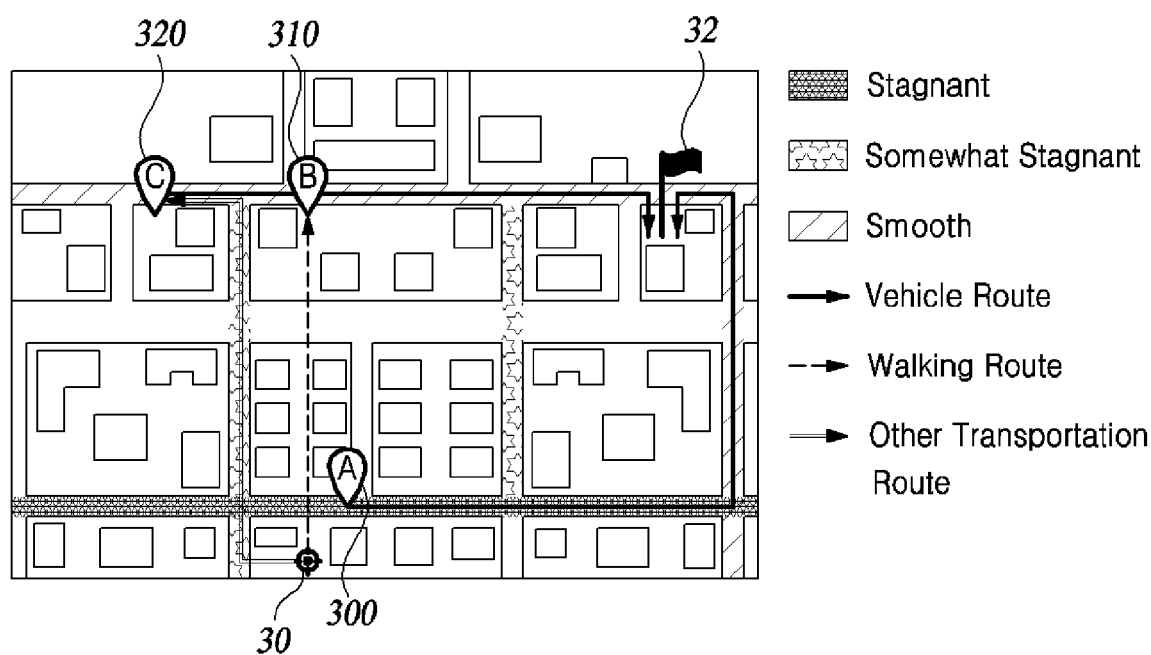
FIG. 3 is an exemplary diagram illustrating a candidate pickup location for each type according to one embodiment of the present disclosure.

FIG. 3 is an exemplary diagram illustrating a candidate pickup location for each type according to one embodiment of the present disclosure.

As shown in FIG. 2, the pickup location recommendation device 100 according to one embodiment of the present disclosure may include all or part of a storage unit 200, an acquisition unit 210, a calculation unit 220, an output unit 230, and an analysis unit 240. Not all blocks shown in FIG. 2 are essential components, and in another embodiment, some blocks included in the pickup location recommendation device 100 may be added, changed, or deleted.

The storage unit 200 may be configured to store map information. The storage unit 200 may be configured to store various related information such as topography, road, building, traffic, distance, and altitude for a specific geographical point as the map information. Since such map information is widely known in the existing field of navigation, a detailed description thereof will be omitted.

The acquisition unit 210 may be configured to acquire user data and traffic data corresponding to the user data.

In this case, the user data may include the location, destination, and/or acceptable walking distance of the user. The traffic data may include traffic flow information of at least one section included in at least one geographical route connecting the user's location and destination and/or operation information of other mode of transportations near the user's location.

The acquisition unit 210 may be implemented as a communication module for receiving the user data from the terminal 110 or for receiving the traffic data from the traffic server 120 or a user interface for receiving the user data from the user, but is not limited thereto.

The calculation unit 220 may be configured to calculate candidate pickup locations respectively corresponding to a plurality of types based on the map information, the user data, and/or the traffic data. Here, the plurality of types may include two or more of a short distance type, a lowest cost type, and a transfer linkage type.

Referring to FIG. 3, the short distance type may correspond to a first candidate pickup location 300 that is close to a user's location 30.

For example, the calculation unit 220 may be configured to select a location closest to the user's location 30 as the first candidate pickup location 300 among one or more first reference locations where the vehicle can stop.

The lowest cost type may correspond to a second candidate pickup location 310 that is within acceptable walking distance from the user's location 30. For example, during rush hour in downtown, it may be advantageous in terms of cost (e.g., fare or time) to get into the vehicle at the second candidate pickup location 310 than to get into the vehicle at the first candidate pickup location 300.

The calculation unit 220 may be configured to select the most advantageous second reference location in terms of cost as the second candidate pickup location 310 among one or more second reference locations within acceptable walking distance from the user's location 30.

As an example, among the one or more second reference locations, the calculation unit 220 may be configured to select a second reference location having the lowest cost of driving a vehicle from the corresponding location to a destination 32 as the second candidate pickup location.

As another example, the calculation unit 220 may be configured to select a second reference location having the shortest driving time of the vehicle from the corresponding location to the destination 32 as the second candidate pickup location among the one or more second reference locations.

As still another example, the calculation unit 220 may be configured to select a location in which the sum of the user's walking time and the vehicle driving time is the smallest as the second candidate pickup location among the one or more second reference locations.

As still another example, the calculation unit 220 may be configured to select any one of the second reference locations as the second candidate pickup location based on a weighted sum of the driving fare of the vehicle, the driving time of the vehicle, and the walking time of the user.

The transfer linkage type may correspond to a third candidate pickup location 320 reachable from the user's location 30 using at least one of other mode of transportation.

The calculation unit 220 may be configured to select, as the third candidate pickup location 320, a third reference location, which is more advantageous than the second candidate pickup location 310 in terms of cost, among one or more third reference locations reachable from the user's location 30 using at least one of other mode of transportation.

As an example, the calculation unit 220 may be configured to select a third reference location, which is more advantageous than the second candidate pickup location 310 in terms of total fare, as the third candidate pickup location 320 among the one or more third reference locations. Specifically, the calculation unit 220 may be configured to select, as the third candidate pickup location 320, a third reference location where the sum of the fares of at least one other mode of transportation and the driving fare of the vehicle from the corresponding location to the destination 32 is less than the driving fare of the vehicle from the second candidate pickup location 310 to the destination 32.

As another example, the calculation unit 220 may be configured to select a third reference location, which is more advantageous than the second candidate pickup location 310 in terms of the total required time, as the third candidate pickup location, among the one or more third reference locations. Specifically, the calculation unit 220 may be configured to select, as the third candidate pickup location 320, a third reference location where the sum of the driving time of at least one other mode of transportation from the user's location 30 to the corresponding location and the driving time of the vehicle from the corresponding location to the destination 32 is less than the sum of the walking time from the user's location 30 to the second candidate pickup location 310 and the driving time of the vehicle from the second candidate pickup location 310 to the destination 32.

As still another example, the calculation unit 220 may be configured to select any one of the third reference locations as the third candidate pickup location 320 based on a weighted sum of the total required fare and the total required time.

The calculation unit 220 may be configured to calculate a walking path connecting the user's location 30 and each of the first candidate pickup location 300 and the second candidate pickup location 310 and a walking time of the user. In addition, based on the traffic data, the calculation unit 220 may be configured to calculate a route of at least one other mode of transportation connecting the user's location 30 and the third candidate pickup location 320, and the driving fare and driving time of the other mode of transportation.

The calculation unit 220 may be configured to calculate a moving route of the vehicle connecting each of the first to third candidate pickup locations 300 to 320 and the destination 32 and may be configured to calculate a driving time and a driving fare of the vehicle corresponding to each route by using the traffic data.

The calculation unit 220 may be configured to determine whether it is unavailable to calculate a significant second candidate pickup location 310. For example, when the second candidate pickup location 310 is disadvantageous in terms of cost compared to the first candidate pickup location 300, the calculation unit 220 may be configured to determine that the calculation of the second candidate pickup location 310 is unavailable. As another example, when the difference in cost between the first candidate pickup location 300 and the second candidate pickup location 310 is within a predetermined threshold value, the calculation unit 220 may be configured to determine that the calculation of the second candidate pickup location 310 is unavailable. As another example, when the distance between the first candidate pickup location 300 and the second candidate pickup location 310 is within a preset threshold value, the calculation unit 220 may be configured to determine that the calculation of the second candidate pickup location 310 is unavailable.

When it is determined that the calculation of the second candidate pickup location 310 is unavailable, the calculation unit 220 may be configured to query the user about the intention to change the acceptable walking distance through the output unit 230 and obtain the changed acceptable walking distance through the acquisition unit 210. The calculation unit 220 may be configured to recalculate the second candidate pickup location 310 and/or the third candidate pickup location 320 based on the changed acceptable walking distance.

The output unit 230 may be configured to provide the calculated candidate pickup locations and operation information of each candidate pickup location to the user. In this case, the operation information of the candidate pickup location may include the route of the vehicle from each candidate pickup location to a preset destination, the driving fare of the vehicle, the driving time of the vehicle, the walking time, the driving fare of at least one other mode of transportation, the driving time of the other mode of transportation, the total cost and/or the total required time.

The output unit 230 may be implemented as a communication module for transmitting the calculated candidate pickup locations and operation information of each candidate pickup location to the terminal 110 or a user interface for displaying the candidate pickup locations and operation information of each candidate pickup location and the like, but is not limited thereto.

The analysis unit 240 may be configured to identify the user's usage status and analyze it. For example, the analysis unit 240 may be configured to analyze the user's selection frequency for each type, the walking distance applied when the second candidate pickup location is selected, and the mode of other transportation applied when the third candidate pickup location is selected. Based on this, the pickup location recommendation device 100 may be configured to give priority to the candidate pickup location corresponding to the user's preferred type or recommend to the user the second candidate pickup location to which the user's preferred walking distance is applied and/or the third candidate pickup location to which the user's preferred mode of transportation is applied.

Figure 4:
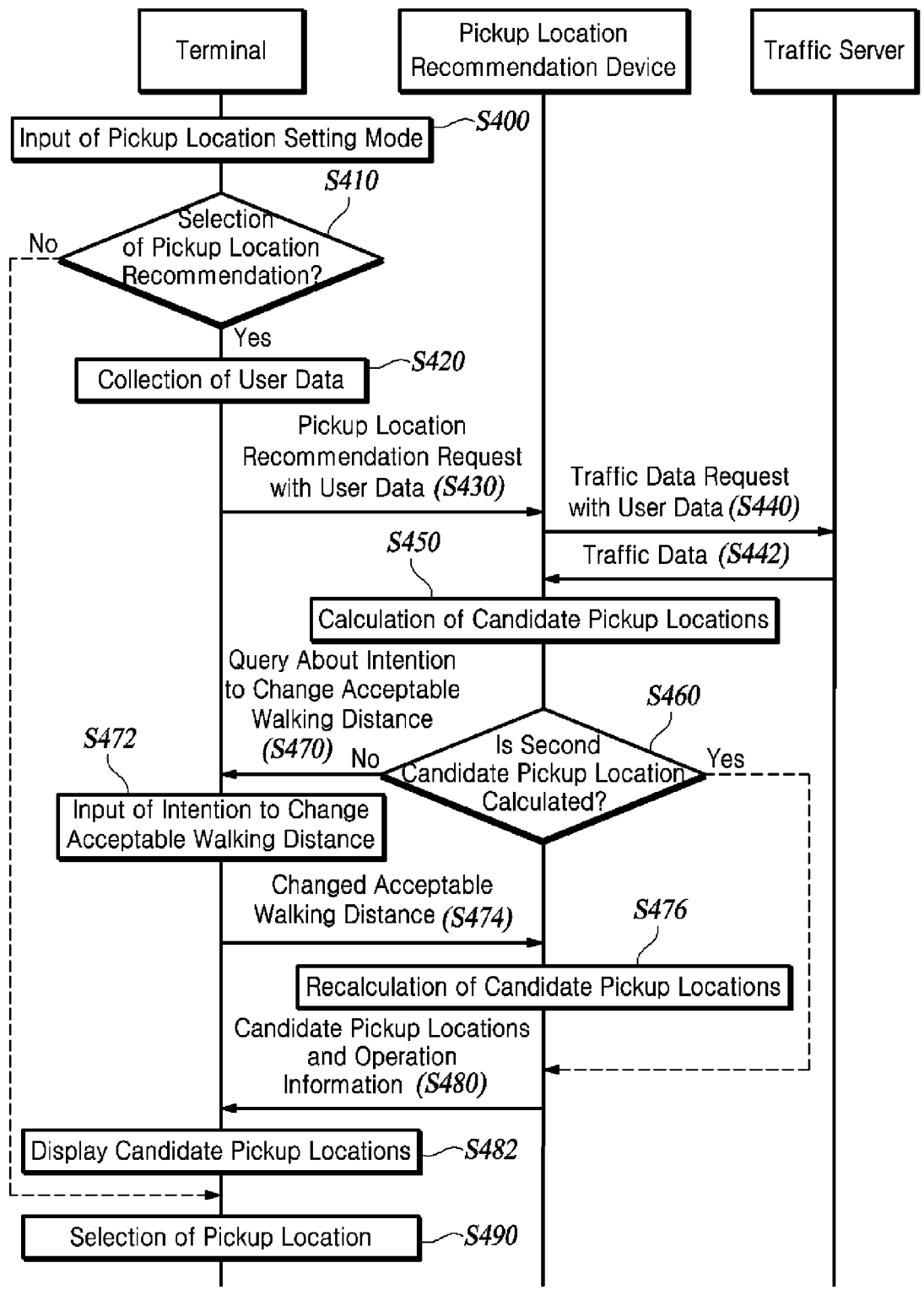
FIG. 4 is a flowchart illustrating a method of providing a pickup location recommendation service according to one embodiment of the present disclosure.

FIG. 4 is a flowchart illustrating a method of providing a pickup location recommendation service according to one embodiment of the present disclosure.

FIGS. 5A to 5D are exemplary diagrams illustrating a screen displayed on a terminal according to one embodiment of the present disclosure.

Figure 5A:
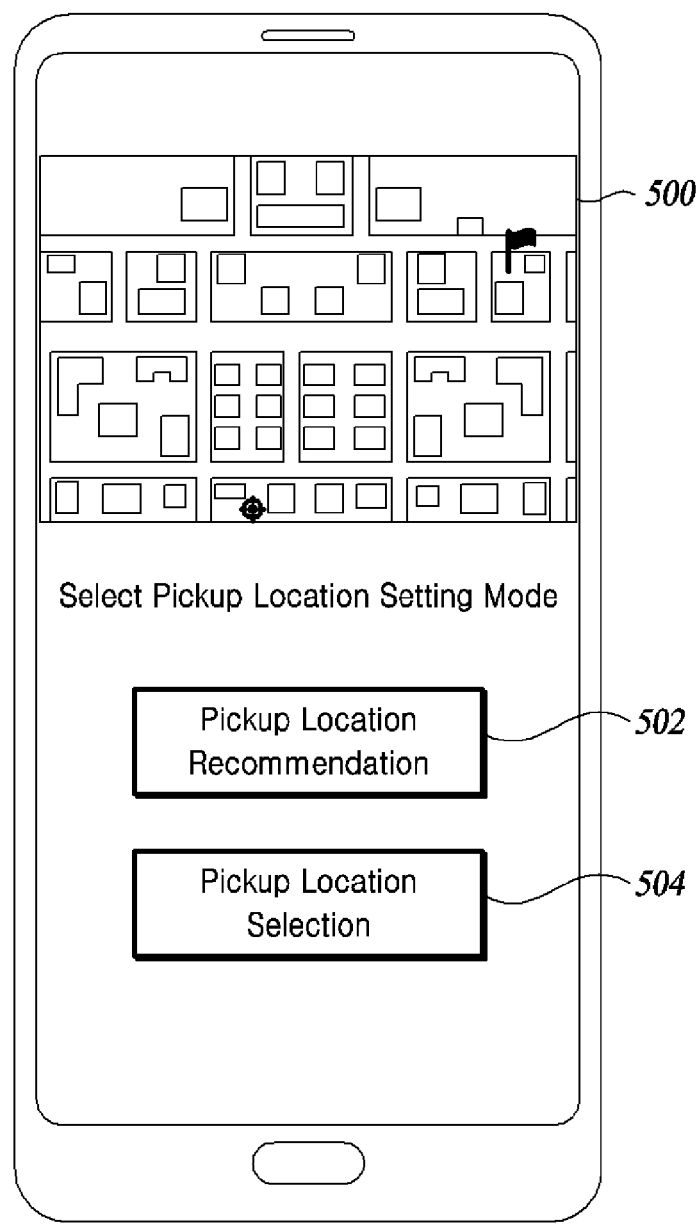
FIGS. 5A to 5D are exemplary diagrams illustrating a screen displayed on a terminal according to one embodiment of the present disclosure.

The terminal 110 may receive a pickup location setting mode from the user (S400). The pickup location setting mode may be, for example, any one of a first mode in which one or more candidate pickup locations are recommended by a pickup location recommendation device 100 and a second mode in which a user selects a specific pickup location by himself or herself. Referring to FIG. 5A, the terminal 110 may display a screen 500 including graphic objects 502 and 504 for receiving a selection of one of the first mode and the second mode and may receive an input of a pickup location setting mode from a user.

When the user selects the first mode (YES in S410), the terminal 110 may collect user data (S420). Here, the user data may include the user's location, destination, and/or acceptable walking distance.

As an example, the terminal 110 may collect the user's location through a sensor such as GPS. As another example, the terminal 110 may collect the user's location and destination through a method in which the user designates and inputs a specific point as the current location or destination on the map displayed on the terminal 110.

Figure 5B:
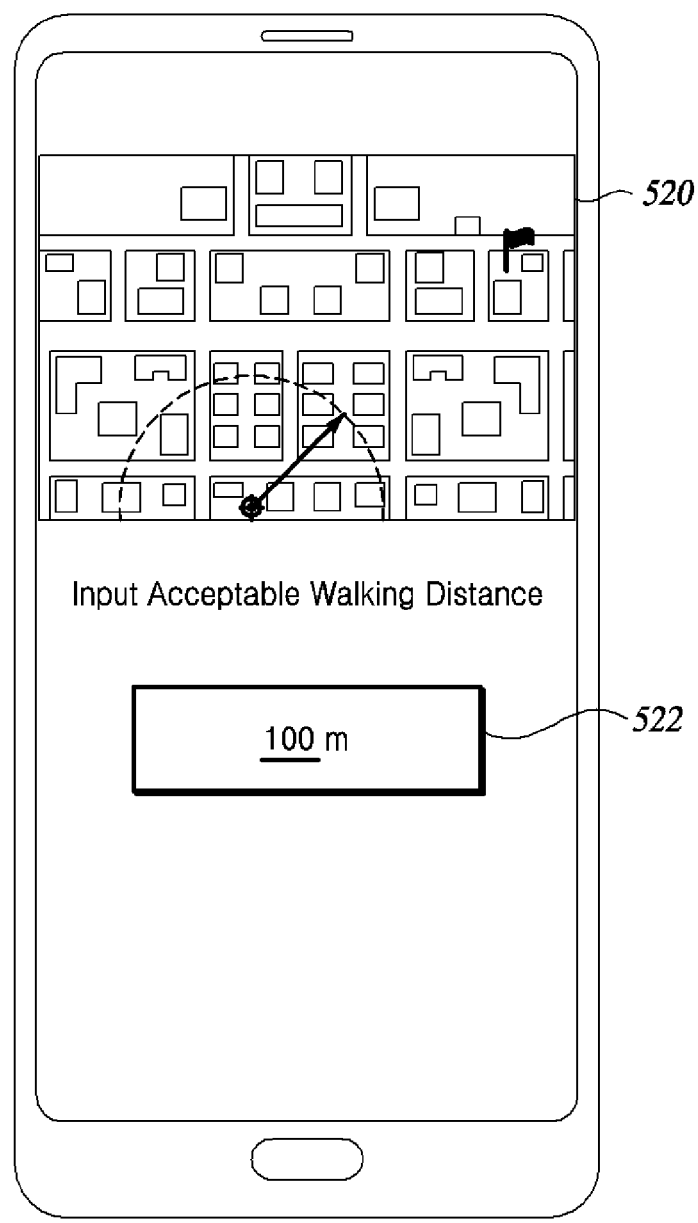

Further, as shown in FIG. 5B, the terminal 110 may collect the acceptable walking distance through a screen 520 including a graphic object 522 for receiving the user's acceptable walking distance. In another example, the terminal 110 may collect acceptable walking distance setting histories of one or more users and determine the acceptable walking distance based on the acceptable walking distance setting histories.

The terminal 110 may transmit a pickup location recommendation request including user data to the pickup location recommendation device 100 (S430).

The pickup location recommendation device 100 may transmit a traffic data request including user data to the traffic server 120 and may receive traffic data corresponding to the user data in response thereto (S440 and S442).

The pickup location recommendation device 100 may calculate a candidate pickup location corresponding to each of the plurality of types by using the map information, the user data, and the traffic data (S450). For example, the pickup location recommendation device 100 may calculate two or more of a first candidate pickup location corresponding to the short distance type, a second candidate pickup location corresponding to the lowest cost type, and a third candidate pickup location corresponding to the transfer linkage type.

When it is unavailable to calculate the second candidate pickup location (NO in S460), the pickup location recommendation device 100 may transmit a request for changing the acceptable walking distance to the terminal 110 (S470).

Figure 5C:
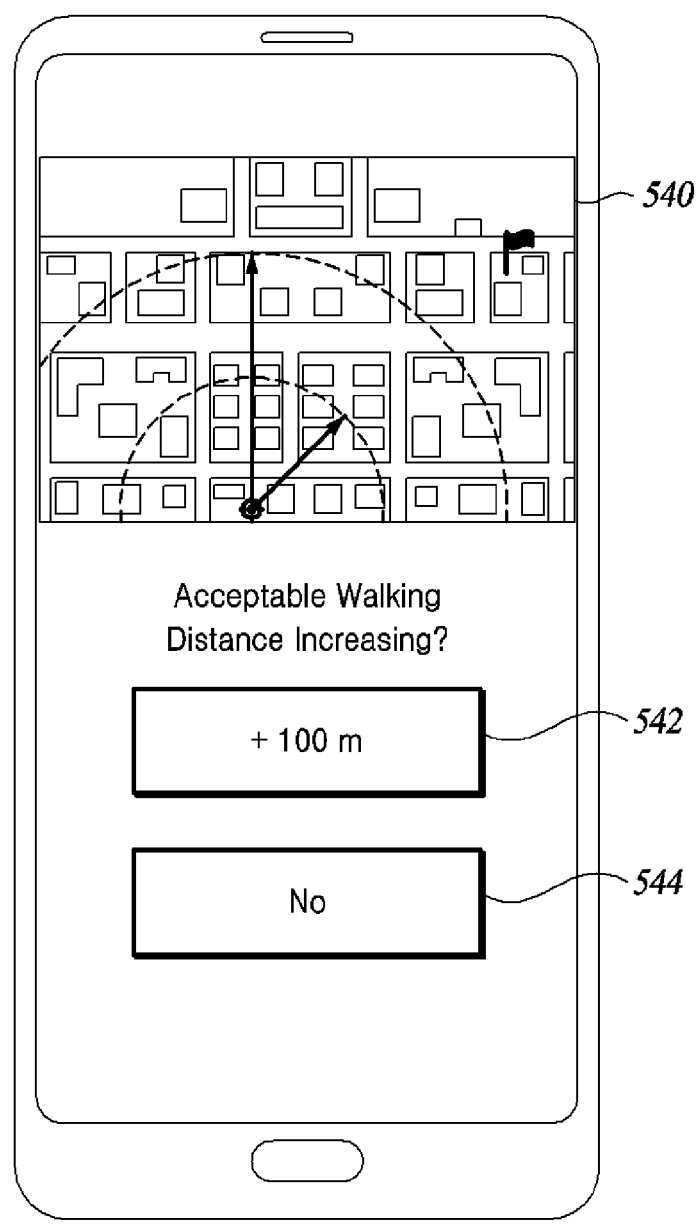

The terminal 110 may receive an input of an intention to change the acceptable walking distance from the user (S472). For example, as shown in FIG. 5C, through a screen 540 including a graphic object 542 for receiving a response of increasing the acceptable walking distance by a preset distance and a graphic object 544 for receiving a response of refusing to change the acceptable walking distance, the terminal 110 may receive an input of an acceptance or rejection of a change in the acceptable walking distance from the user. As another example, the terminal 110 may receive an input of a changed acceptable walking distance from the user.

When the user accepts the change of the acceptable walking distance, the terminal 110 may transmit the changed acceptable walking distance to the pickup location recommendation device 100 (S474).

The pickup location recommendation device 100 may recalculate the candidate pickup locations for each type based on the changed acceptable walking distance (S476).

The pickup location recommendation device 100 may transmit candidate pickup locations for each type and operation information of each candidate pickup location to the terminal 110 (S480).

Figure 5D:
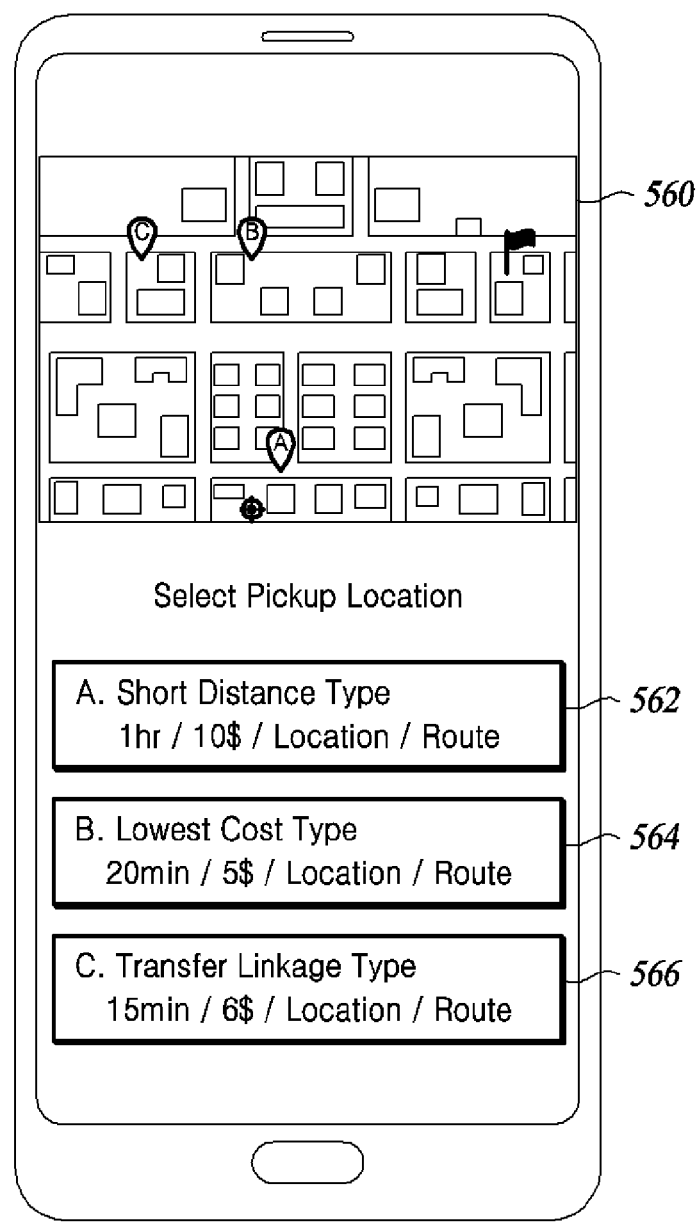

The terminal 110 may display candidate pickup locations for each type and operation information of each candidate pickup location on a screen to receive a selection of a specific type of candidate pickup location from the user (S482 and S490). For example, as shown in FIG. 5D, the terminal 110 may display a screen 560 including graphic objects 562, 564 and 566 for receiving a selection of any one of the first to third candidate pickup locations. In this case, the graphic objects 562, 564 and 566 may display operation information of each candidate pickup location in the form of text or an image. Based on applying a preset type of touch to at least one area of the graphic objects 562, 564 and 566, the terminal 110 may display the first to third candidate pickup locations or routes corresponding to the first to third candidate pickup locations on the map.

Meanwhile, when the user selects the second mode (NO in S410), the terminal 110 may receive a vehicle pickup location and a destination through a method in which the user designates and inputs a specific point as the vehicle pickup location or destination on a map displayed on the terminal 110.

Figure 6:
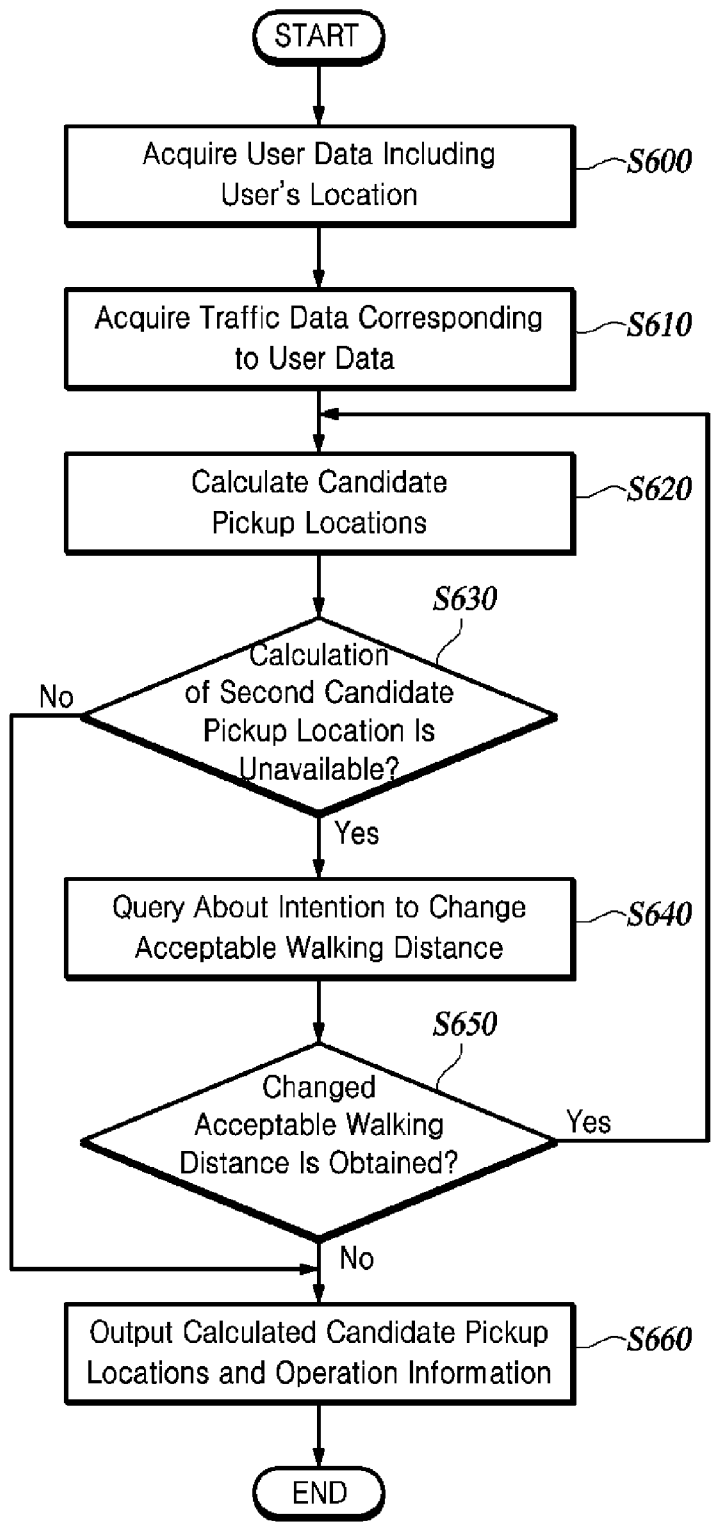
FIG. 6 is a flowchart illustrating a method of recommending a pickup location according to one embodiment of the present disclosure.

FIG. 6 is a flowchart illustrating a method of recommending a pickup location according to one embodiment of the present disclosure.

The method illustrated in FIG. 6 may be performed by the above-described pickup location recommendation device 100, a vehicle distribution server, a terminal, a vehicle, or the like (hereinafter referred to as an "electronic device"), and thus a redundant description thereof will be omitted.

The electronic device may acquire user data including the location of a user (S600). In this case, the user data may further include an acceptable walking distance of the user. The acceptable walking distance of the user may be set by the user, or the electronic device may determine the acceptable walking distance based on the user's setting history.

The electronic device may acquire traffic data corresponding to the user data (S610).

The electronic device may calculate a plurality of candidate pickup locations corresponding to the plurality of types based on the user data and the traffic data (S620). Here, the plurality of types may include two or more of the short distance type, the lowest cost type, and the transfer linkage type.

The short distance type may correspond to a first candidate pickup location close to the user's location. The lowest cost type may correspond to a second candidate pickup location which exists within acceptable walking distance from the user's location and for which the vehicle's driving fare, the vehicle's driving time, or the total required time is the least. The transfer linkage type may correspond to a third candidate pickup location which can be reached using at least one other mode of transportation from the user's location. The other mode of transportation may be, for example, at least one of a bus, a subway, a shared bicycle, or a shared kickboard.

Among one or more reference locations reachable by using at least one other mode of transportation, the electronic device may select, as a third candidate pickup location, a reference location for which the sum of the driving fares of the other mode of transportation and the vehicle is less than the fare for the lowest cost type or the sum of the driving time of the other mode of transportation and the vehicle is less than the time for the lowest cost type.

The electronic device may determine whether it is unavailable to calculate the second candidate pickup location (S630). When it is unavailable to calculate a significant second candidate pickup location, the electronic device may determine that it is unavailable to calculate the second candidate pickup location. For example, when the distance and/or the difference in cost between the first candidate pickup location and the second candidate pickup location is within a preset threshold, the electronic device may determine that the calculation of the second candidate pickup location is unavailable.

In response to the determination that it is unavailable to calculate the second candidate pickup location (YES in S630), the electronic device may query the user about the intention to change the acceptable walking distance (S640). In response to the query, the electronic device may obtain the changed acceptable walking distance.

When the changed acceptable walking distance is obtained (YES in S650), the electronic device may recalculate one or more candidate pickup locations based on the changed acceptable walking distance (S620). For example, the electronic device may recalculate the second candidate pickup location based on the changed acceptable walking distance and may recalculate the third candidate pickup location which requires less costs (e.g., time and/or charge) than the recalculated second candidate pickup location.

The electronic device may provide the calculated/recalculated candidate pickup locations and operation information of each candidate pickup location to the user (S660). In this case, the operation information of each candidate pickup location may include a route of the vehicle from each candidate pickup location to a preset destination, a driving fare of the vehicle, and/or a driving time of the vehicle. Meanwhile, the operation information of the third candidate pickup location may include a time when the user or other mode of transportation is expected to arrive at the corresponding third candidate pickup location.

Meanwhile, when it is determined that the calculation of the second candidate pickup location is unavailable, but the user does not approve the change of the acceptable walking distance (NO in S650), the electronic device may provide the user with operation information of the remaining pickup locations other than the second candidate pickup location, for example, the first candidate pickup location and the third candidate pickup location, and operation information of the remaining pickup locations (S660).

Each component of the device or method according to embodiments of the present disclosure may be implemented as hardware or software or a combination of hardware and software. In addition, the function of each component may be implemented as software and a microprocessor may be implemented to execute the function of software corresponding to each component.

Various implementations of the systems and the methods described herein may be realized by a digital electronic circuit, an integrated circuit, a field programmable gate array (FPGA), an application specific integrated circuit (ASIC), computer hardware, firmware, software, and/or a combination thereof. These various implementations may include an implementation by one or more computer programs executable on a programmable system. The programmable system includes at least one programmable processor (which may be a special purpose processor or a general-purpose processor) coupled to a storage system, at least one input device, and at least one output device to receive and transmit data and instructions therefrom and thereto. Computer programs (also known as programs, software, software applications or codes) contain instructions for the programmable processor and are stored in a "computer-readable recording medium".

The computer-readable recording medium includes all types of recording devices in which data readable by a computer system is stored. The computer-readable recording medium may include non-volatile or non-transitory mediums such as ROM, CD-ROM, a magnetic tape, a floppy disk, a memory card, a hard disk, an optical disk, and a storage device, and may further include a temporary medium such as a data transmission medium. In addition, the computer-readable recording medium may be distributed in a network-connected computer system, and computer-readable codes may be stored and executed in a distributed manner.

Although it is described in this specification that the processes are sequentially executed in the flowcharts/timingcharts of embodiments of the present disclosure, this is merely illustrative of the technical idea of one embodiment of the present disclosure. In other words, since a person of ordinary skill in the art to which the embodiments of the present disclosure pertain may make various modifications and changes by changing the order of the processes described in the flowchart/timingcharts or performing one or more of the processes in parallel without departing from the essential characteristics of the embodiments of the present disclosure, the flowcharts/timingcharts are not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method, performed by a device, for recommending a location in which a vehicle picks up a user, the method comprising:
   receiving, from a terminal of the user, user data comprising a GPS sensor data corresponding to a location of the user and an acceptable walking distance is set by the user or determined based on a history of the user;
   transmitting, to a traffic server, a traffic data request including the user data;
   receiving, from the traffic server, traffic data in response to the traffic data request;
   calculating a plurality of candidate pickup locations corresponding to a plurality of types based on the user data and the traffic data;
   transmitting, to the terminal, the plurality of candidate pickup locations and operation information of each of the candidate pickup locations of the plurality of candidate pickup locations; and
   picking up, by the vehicle, the user at one of the candidate pickup locations of the plurality of candidate pickup locations,
   wherein the plurality of types comprises a lowest cost type;
   wherein calculating the plurality of candidate pickup locations comprises selecting, among one or more second reference locations that exist within the acceptable walking distance from the location of the user, a second reference location for which a driving fare, a driving time, or a total required time is the least as a second pickup location which corresponds to the lowest cost type; and
   wherein the plurality of types further comprises:
      a short distance type that corresponds to a first candidate pickup location close to the location of the user; and
      a transfer linkage type that corresponds to a third candidate pickup location which is reachable from the location of the user using at least one other mode of transportation.

2. The method of claim 1, wherein the operation information for each of the candidate pickup locations comprises a route of the vehicle, the driving fare, and the driving time from each of the candidate pickup locations to a preset destination.

3. The method of claim 1, wherein the other mode of transportation comprises a bus, a subway, a shared bicycle, or a shared kickboard.

4. The method of claim 1, wherein the operation information of the third candidate pickup location comprises a time when the user or the other mode of transportation is expected to arrive at the third candidate pickup location.

5. The method of claim 1, wherein calculating the plurality of candidate pickup locations comprises selecting, among one or more reference locations reachable by using the other mode of transportation, a reference location in which a sum of a driving fare of the other mode of transportation and the vehicle is less than a fare for the lowest cost type or a sum of a driving time of the other mode of transportation and the vehicle is less than a time for the lowest cost type as the third candidate pickup location.

6. A method, performed by a device, for recommending a location in which a vehicle picks up a user, the method comprising:
   receiving, from a terminal of the user, user data comprising a GPS sensor data corresponding to a location of the user;
   transmitting, to a traffic server, a traffic data request including the user data;
   receiving, from the traffic server, traffic data in response to the traffic data request;
   performing a calculation to determine a plurality of candidate pickup locations corresponding to a plurality of types based on the user data and the traffic data, the plurality of types including a lowest cost type, wherein the calculation comprises attempting to select, among one or more second reference locations that exist within an acceptable walking distance from the location of the user, a second reference location for which a driving fare, a driving time, or a total required time is the least as a second pickup location which corresponds to the lowest cost type, wherein the acceptable walking distance is set by the user or determined based on a history of the user;
   transmitting, to the terminal, the plurality of candidate pickup locations and operation information of each of the candidate pickup locations;
   querying the user about an intention to change the acceptable walking distance in response to a determination that it is unavailable to calculate a second candidate pickup location; and
   picking up, by the vehicle, the user at one of the plurality of candidate pickup locations.

7. The method of claim 6,
   wherein the plurality of types further comprises a short distance type which corresponds to a first candidate pickup location close to the location of the user; and
   wherein querying the user comprises determining that calculation of the second pickup location is unavailable when a distance between the first candidate pickup location and the second pickup location is within a first preset threshold and a difference in costs between the first candidate pickup location and the second pickup location is within a second preset threshold.

8. The method of claim 6, further comprising:
   obtaining a changed acceptable walking distance in response to the querying; and
   calculating the second pickup location based on the changed acceptable walking distance.

9. A device for recommending a location in which a vehicle picks up a user, the device comprising:
   at least one memory storing computer-executable instructions; and
   at least one processor configured to execute the computer-executable instructions to:
      receive, from a terminal of the user, user data comprising a GPS sensor data corresponding to a location of the user and an acceptable walking distance that is set by the user or determined based on a history of the user; and
      transmit, to a traffic server, a traffic data request including the user data;
      receive, from the traffic server, traffic data in response to the traffic data request;
      calculate a plurality of candidate pickup locations corresponding to a plurality of types including a lowest cost type, based on the user data and the traffic data;
      transmit, to the terminal, the plurality of candidate pickup locations and operation information of each of the candidate pickup locations of the plurality of candidate pickup locations;
      select, among one or more second reference locations that exist within the acceptable walking distance from the location of the user, a second reference location for which a driving fare, a driving time, or a total required time is the least as a second pickup location which corresponds to the lowest cost type,
wherein the plurality of types further comprises:
  a short distance type that corresponds to a first candidate pickup location close to the location of the user, and
  a transfer linkage type that corresponds to a third candidate pickup location which is reachable from the location of the user using at least one other mode of transportation; and
dispatch the vehicle to pick up the user at one of the candidate pickup locations of the plurality of candidate pickup locations.

10. The device of claim 9, wherein the operation information for each of the candidate pickup locations comprises a route of the vehicle, the driving fare, and the driving time from each of the candidate pickup locations to a preset destination.

11. The device of claim 9, wherein the other mode of transportation comprises a bus, a subway, a shared bicycle, or a shared kickboard.

12. The device of claim 9, wherein the operation information of the third candidate pickup location comprises a time when the user or the other mode of transportation is expected to arrive at the third candidate pickup location.

13. The device of claim 9, wherein the at least one processor is further configured to:
  select, among one or more reference locations reachable by using the other mode of transportation, a reference location in which a sum of a driving fare of the other mode of transportation and the vehicle is less than a fare for the lowest cost type or a sum of a driving time of the other mode of transportation and the vehicle is less than a time for the lowest cost type as the third candidate pickup location.

14. The device of claim 9, wherein the at least one processor is further configured to query the user about an intention to change the acceptable walking distance in response to a determination the second pickup location cannot be selected.

15. The device of claim 14, wherein the at least one processor is further configured to determine that calculation of the second pickup location is unavailable when a distance between the first candidate pickup location and the second pickup location is within a first preset threshold and a difference in costs between the first candidate pickup location and the second pickup location is within a second preset threshold.

16. The device of claim 14, wherein the at least one processor is further configured to:
  acquire a changed acceptable walking distance in response to the query; and
  calculate the second pickup location based on the changed acceptable walking distance.

* * * * *